United States Patent
Bernitz et al.

(10) Patent No.: US 10,395,512 B2
(45) Date of Patent: Aug. 27, 2019

(54) MOBILE SIGNAL UNIT, MOBILE OPERATING UNIT AND MOBILE DEFENSE SYSTEM

(71) Applicant: Georg Bernitz, Nuremberg (DE)

(72) Inventors: Georg Bernitz, Nuremberg (DE); Daniel Bernitz, Regensburg (DE)

(73) Assignee: Georg Bernitz, Nuremberg (DE)

( * ) Notice: Subject to any disclaimer, the term of this patent is extended or adjusted under 35 U.S.C. 154(b) by 0 days.

(21) Appl. No.: 15/962,384

(22) Filed: Apr. 25, 2018

(65) Prior Publication Data

US 2018/0315296 A1    Nov. 1, 2018

(30) Foreign Application Priority Data

Apr. 28, 2017 (DE) .................. 10 2017 109 284
May 5, 2017 (DE) .................. 10 2017 109 724

(51) Int. Cl.
*G08B 25/01* (2006.01)
*G08B 21/24* (2006.01)
(Continued)

(52) U.S. Cl.
CPC ............. *G08B 25/016* (2013.01); *G08B 3/10* (2013.01); *G08B 13/1427* (2013.01); *G08B 15/004* (2013.01); *G08B 21/0216* (2013.01); *G08B 21/0247* (2013.01); *G08B 21/0277* (2013.01); *G08B 21/0288* (2013.01); *G08B 21/0297* (2013.01); *G08B 21/24* (2013.01);
(Continued)

(58) Field of Classification Search
CPC combination set(s) only.
See application file for complete search history.

(56) References Cited

U.S. PATENT DOCUMENTS 5,936,530 A  *  8/1999  Meinhold ............ G08B 21/028
                                                        340/539.1
6,133,830 A     10/2000  D'Angelo et al.
(Continued)

FOREIGN PATENT DOCUMENTS

DE         3917069      11/1990
DE     202004006170     10/2004
(Continued)

OTHER PUBLICATIONS

German Office Action (10 2017 109 724.4), dated Jan. 15, 2018.
European Patent Office Search Report (18169234.4), dated Oct. 26, 2018.

*Primary Examiner* — Travis R Hunnings
(74) *Attorney, Agent, or Firm* — Dority & Manning, P.A.

(57) ABSTRACT

A mobile signal unit is responsive to a mobile operating unit yet sufficiently compact and lightweight for unobtrusive connection to an item of clothing, a purse, and/or a backpack. It has a siren powered by gas or electricity. It has a wireless first interface, through which the siren can be remotely activated and/or deactivated by the mobile operating unit. The siren can be activated manually by an activation command that matches an activation code stored in a memory unit of the signal unit and/or the operating unit. The siren is automatically activated after the wireless connection to the operating unit if a connection signal strength of the operating unit falls below a threshold and/or the wireless connection to the operating unit is interrupted.

9 Claims, 1 Drawing Sheet

(51) Int. Cl.
*H04B 1/3888* (2015.01)
*H04B 1/3827* (2015.01)
*G08B 25/10* (2006.01)
*G08B 15/00* (2006.01)
*G08B 3/10* (2006.01)
*G08B 13/14* (2006.01)
*G08B 21/02* (2006.01)

(52) U.S. Cl.
CPC ............ *G08B 25/10* (2013.01); *H04B 1/385* (2013.01); *H04B 1/3888* (2013.01)

(56) References Cited

U.S. PATENT DOCUMENTS

| | | | | |
|---|---|---|---|---|
| 7,042,361 | B2* | 5/2006 | Kazdin | G08B 21/0261 340/12.54 |
| 7,446,664 | B2* | 11/2008 | White | G08B 21/0291 340/539.12 |
| 9,013,314 | B2* | 4/2015 | Golomb | G08B 21/0294 340/539.15 |
| 2002/0175820 | A1* | 11/2002 | Oja | G08B 21/0222 340/573.4 |
| 2006/0250255 | A1* | 11/2006 | Flanagan | G08B 21/0208 340/573.4 |
| 2006/0267760 | A1* | 11/2006 | Shecter | G08B 21/0216 340/539.15 |
| 2007/0262862 | A1* | 11/2007 | Barrett | G08B 13/1427 340/539.15 |
| 2012/0182126 | A1 | 7/2012 | Simpson | |
| 2014/0073262 | A1 | 3/2014 | Gutierrez et al. | |
| 2015/0250143 | A1 | 9/2015 | Klossner | |
| 2015/0279199 | A1 | 10/2015 | Yarkoni | |

FOREIGN PATENT DOCUMENTS

| | | |
|---|---|---|
| DE | 102013014849 | 3/2014 |
| GB | 2542168 | 3/2017 |
| GB | 2542606 | 3/2017 |
| WO | WO 03/033842 | 4/2003 |
| WO | WO 2010092192 | 8/2010 |

* cited by examiner

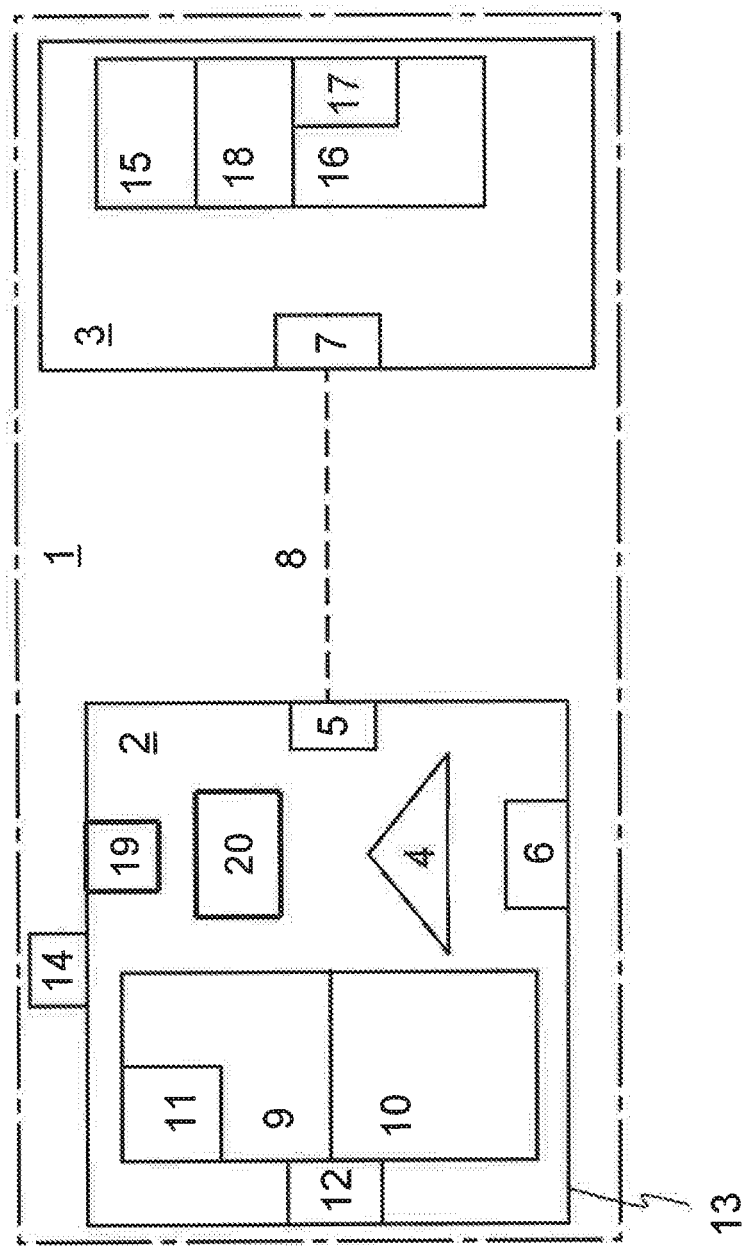

MOBILE SIGNAL UNIT, MOBILE OPERATING UNIT AND MOBILE DEFENSE SYSTEM

FIELD OF THE INVENTION

The present invention relates to a mobile signal unit for being carried in or on a close-fitting object, in particular an item of clothing or a carrying case, preferably a purse, a handbag, a travel bag and/or a backpack, with a siren, by means of which an acoustic defense signal can be generated.

The invention also relates to a mobile operating unit, in particular an accessory, a bracelet, a necklace, a ring, a preferably cordless telecommunications unit and/or a wristwatch, for activating a mobile signal unit, in particular a haptic and/or acoustic input unit for entering an activation command.

Furthermore, the invention relates to a mobile defense system for fending off physical attacks with a mobile signal unit for being carried in or on a close-fitting object, which comprises a siren, by means of which an acoustic defense signal can be generated, and a mobile operating unit for activating the mobile signal unit.

BACKGROUND OF THE INVENTION

A device for self-defense against attacks from the outside, with which a weapon is arranged in a removal mounting, is known from DE 20 2004 006 170 U1. When removing the object, a contact arranged between the weapon and the removal mounting activates a siren. Since the removal mounting is preferably arranged in closed containers such as bags, it can take a long time for the weapon to be removed from the removal mounting and for the alarm to ultimately be activated.

SUMMARY OF THE INVENTION

The task underlying the invention is solved by the characteristics described below. Additional advantageous embodiments are also described.

A mobile signal unit for being carried in or on a close-fitting object with at least one siren is proposed. The close-fitting object is in particular an item of clothing or a carrying case. The close-fitting object is preferably a purse, a handbag, a travel bag and/or a backpack. By means of the siren, an acoustic defense signal can be generated. The siren is preferably powered by gas or electricity. The signal unit comprises a wireless first interface, through which the siren can be remotely activated and deactivated by an operating unit provided for this purpose. Alternatively, the siren can only be activated or deactivated via the first interface. The signal unit is designed in such a manner that the siren can be activated manually with an activation command if the activation command matches an activation code stored in a memory unit of the signal unit and/or the operating unit provided for this purpose. The activation command is coded. The activation command may be, for example, a numeric code, a keyboard shortcut, a gesture and/or a voice command. In the event of a physical attack, the activation command can thus be, for example, a defensive posture or defensive gesture, through which the siren can be activated. Furthermore, the coded deactivation advantageously prevents the defense signal from being deactivated by the attacker.

In addition or alternatively, it is advantageous if the signal unit is designed in such a manner that the siren can automatically be activated after the wireless connection to the operating unit if a connection signal strength of the operating unit falls below a threshold and/or the wireless connection to the operating unit is interrupted. Thereby, upon the theft of a handbag (for example), it can be ensured that the siren is automatically activated if the mobile signal unit or, in particular, the handbag is too far away from the mobile operating unit or the owner.

It is advantageous if the signal unit comprises a pressure vessel, which is connected to the gas-operated siren via a valve.

The mobile signal unit is preferably designed to be so compact that it can be arranged in or on the object without causing any disturbance. Given this, women or children in particular are able to permanently carry the mobile signal unit in a close-fitting manner. In the case of an emergency, such as a theft or robbery, the victim can remotely activate the siren via the wireless first interface with an operating unit provided for this purpose. The operating unit is preferably designed to be mobile and handy, such that it can be actuated rapidly upon an attack. After the siren has been activated to generate the acoustic defense signal, this is preferably difficult to deactivate, in particular via a coded deactivation command, or not able to be deactivate at all. If the mobile signal unit is, for example, sewn into a handbag, and this is stolen, the handbag owner can rapidly and easily operate the siren via the wireless first interface. This can take place either manually via an activation command or automatically when a signal strength is not reached. The operating unit necessary for the operation is preferably carried directly on one's body. Alternatively, it is also conceivable to activate the siren upon a physical attack, in order to scare the attacker through the defense signal, and in the best case to drive away the attacker. The defense signal could be output in the form of words, for example. The acoustic defense signal is preferably above a human pain sensation threshold. The sound pressure of the defense signal is preferably greater than 60 dB. Preferably, the sound pressure of the defense signal is greater than 100 dB. The wireless first interface enables the remote-controlled activation of the siren, in order to react to attacks as rapidly as possible, and thereby signal a call for help.

It is advantageous if the first interface is a radio interface and/or an infrared interface. The radio interface is preferably designed to receive and/or transmit, for example, radio waves, such as a Bluetooth signal. The infrared interface is preferably designed as a receiver and/or transmitter of infrared radiation. Preferably, the first interface is designed in such a manner that its ability to receive information is functional without any limitation, even if the first interface is located, for example, in a bag. Through the first interface, it is possible to cause the activation of the signals, even if the signal unit is not directly accessible. Alternatively or in addition, it is advantageous if the first interface is designed to be unidirectional or bidirectional. The first interface is designed to be unidirectional, such that signals can only be received through it. The first interface is designed to be bidirectional, such that signals can be both received and transmitted. "Unidirectional" means that, preferably, only the receiving or transmission of signals is possible. "Bidirectional" means that, preferably, the receiving and transmitting of signals is possible. In the case of a bidirectional first interface, it is advantageous if the signal unit is able to transmit at least one status message. Thus, the communication of the mobile signal unit with a device triggering the signal can be implemented in a manner not depending on location.

Furthermore, it is advantageous if the signal unit features a locking system. By means of the locking system, after its activation, the siren can no longer be deactivated, or can only be deactivated with a deactivation command that can be entered directly into the signal unit, if such deactivation command matches a deactivation code stored in the memory unit of the signal unit and/or the operating unit provided for this purpose. Alternatively, the locking system can be deactivated with a deactivation command transmitted indirectly by the operating unit provided for this purpose. The locking system is preferably designed in such a manner that the siren can only be turned off if one knows the deactivation code. The deactivation code is preferably to be defined prior to the first use of the mobile signal unit. The deactivation code is preferably stored in the mobile signal unit itself or in the operating unit provided for this purpose. The deactivation code may be, for example, a numerical code that has to be entered on the operating unit. Alternatively or in addition, it may be a gesture, in particular a hand gesture, and/or a voice command. The locking system ensures that the criminal is not able to turn off the signal.

It is advantageous if the signal unit comprises a first control unit, with which the activation command can be compared with the stored activation code, the deactivation command can be compared with the stored deactivation code, the wireless connection to the operating unit can be monitored and/or the siren for activating and/or deactivating can be controlled.

Thus, the locking system advantageously comprises a first control unit, by means of which, after the activation of the siren, the first interface can be locked and/or unlocked. The first control unit is preferably designed to detect the contacting of the first interface. The contacting of the first interface preferably means that the siren is triggered and the defense signal is generated. Furthermore, the first control unit is preferably designed to lock the first interface. In the first control unit, the deactivation code is preferably stored, on the basis of which the entered deactivation command is checked for its correctness. Preferably, the first interface is not released by the first control unit until the correct deactivation command has been registered. In this manner, it can be ensured that the defense signal cannot be switched off by the attacker.

It is advantageous if the signal unit features an actuating element, by means of which the deactivation command for deactivating the siren can be entered. The actuating element is preferably designed in such a manner that the siren is triggered electrically and/or electromechanically. The actuating element is preferably a push button. The actuating element is preferably arranged in an easily accessible location. For example, the mobile signal unit may feature one or more push buttons, by means of which the siren can be triggered manually. Alternatively, the actuating element is preferably a pressure cap, which must be pressed down to trigger the alarm signal. The mobile signal unit is, for example, an acoustic alarm device. The actuating element is preferably fastened to a ring, bracelet, belt, and/or in a jacket pocket or the like, such that the siren can be easily activated. If the siren is erroneously activated, it can be quickly deactivated by means of the deactivation command, if this matches the stored deactivation code. For example, the manual deactivation command may be a repeated pressing of the actuating element, in particular in a specific time sequence.

It is advantageous if the signal unit features a protective housing. In the protective housing, the siren, the first control unit, a power storage unit and/or the first interface are incorporated in a manner protected against external force. The protective housing is, in particular, made of metal and/or a fiber composite material. The signal is preferably generated as with a signal horn via a gas by means of high pressure, such that no additional power storage unit is necessary. Alternatively, the signal unit may comprise a power storage unit, in particular a battery.

Furthermore, it is advantageous if the signal unit features a fastening means, such that the signal unit can be fastened to the close-fitting object, So that the signal unit can be used, depending on clothing, accessories or season, the fastening means is preferably a belt, a Velcro® fastener and/or a snap fastener button. The signal unit is preferably sewn into a fabric or a bag.

Furthermore, it is advantageous if the signal unit comprises a lighting element, in particular a lamp, by means of which an optical signal can be generated. The optical signal is preferably output in the form of a flashlight. At this, the signal unit is preferably arranged in a visible location, such that the flashlight can be clearly seen if it is generated. Preferably, the acoustic and optical signals are generated simultaneously, such that, in addition to the loud defense signal, a light is also generated. The lighting element can preferably be activated via the operating unit. The activation and/or deactivation of the lighting element is preferably carried out in an analogous manner to the activation and/or deactivation of the siren of the signal unit. In addition to the acoustic positioning, it is thus possible at night to rapidly identify the location of the attack. In forests or dark streets, this can quickly attract attention. The signal unit may additionally comprise the lighting element. Likewise, however, the signal unit may only include the siren to generate the alarm signal.

A mobile operating unit for activating a mobile signal unit is also proposed. The signal unit is preferably designed in accordance with one or more of the preceding and/or following characteristics of the description. The mobile operating unit is preferably an accessory, a bracelet, a necklace, a ring, a cordless telecommunications unit and/or a wristwatch. The mobile operating unit features an input unit for entering an activation command and a wireless second interface. The input unit is preferably designed to be haptic and/or acoustic. The second interface is designed to connect to a first interface of the mobile signal unit provided for this purpose. The operating unit is designed in such a manner that, by means of it, a siren of the signal unit can be remotely activated and/or deactivated. The operating unit features a memory unit, in which an activation code is stored. Furthermore, the operating unit features a second control unit, which compares the entered activation command with the stored activation code and activates the siren in the event of a match.

It is advantageous if the operating unit features a first device, in particular an accessory, a bracelet, a necklace, a ring, a cordless telecommunications unit and/or a mobile clock, in particular a wristwatch, and a second device, in particular a cordless telecommunications unit, preferably a mobile telephone, which are preferably connectable and/or connected to each other wirelessly. At this, the first device preferably comprises the input unit. In addition or alternatively, therein the second device comprises the wireless second interface, the second control unit and/or the memory unit.

It is also advantageous if the second control unit is designed in such a manner that, after the activation of its siren, the signal unit provided for this purpose can no longer be deactivated by the mobile operating unit; that is, non-destructively.

The operating unit preferably features a push button, which is connected to the second interface. Alternatively, the operating unit is preferably a telecommunications unit (which is particularly cordless), preferably a mobile telephone, which allows for acoustic operation in addition to haptic operation. The activation command is preferably carried out by pressing, wiping, a fingerprint or a predetermined acoustic sound. By entering the activation command, a signal is preferably output by the second interface. The second interface is preferably designed in such a manner that it is able to communicate with the first interface of the signal unit. Through the communication of the operating unit with the signal unit by means of the two interfaces, the signal unit is preferably controllable, such that the siren generates an alarm signal. The communication between the two interfaces is wireless.

In this manner, the operating unit can be carried, for example, in one's hand, while the signal unit is firmly arranged in a jacket pocket. If the carrier gets into a dangerous situation, only the haptic or acoustic activation command must be given. As a result of the activation, the second interface of the operating unit is driven to transmit a signal. The first interface of the signal unit receives this signal, whereupon the siren is activated and an alarm signal is generated.

It is advantageous if a deactivation code is stored in the memory unit.

It is also advantageous if the second control unit is designed in such a manner that, after the activation of its siren, the signal unit provided for this purpose can no longer be deactivated by the mobile operating unit, or can be deactivated with a deactivation command to be entered via the input unit, whereas the second control unit compares the entered deactivation command with the stored deactivation code and deactivates the signal unit in the event of a match.

It is advantageous if the input unit comprises a gesture recognition unit and/or a speech recognition unit for entering the activation and/or deactivation command.

It is also advantageous if the input unit features a sensor for gesture, speech and/or stress degree recognition, in particular a camera, a position sensor, a speed sensor, an acceleration sensor, a body temperature sensor, a pulse rate sensor and/or a perspiration sensor.

It is advantageous if the second control unit is designed in such a manner that, upon the activation of the signal unit, it automatically sends an emergency call via a telecommunications unit, in particular cordless or wireless, of the operating unit, in particular of the second device.

It is advantageous if the operating unit features a second control unit electrically connected to the input unit and the second interface. In the second control unit, a control program is stored. The control program is preferably designed in such a manner that the second interface emits a signal, in particular an infrared or radio signal, if the activation command is entered at the operating unit. The second interface generates the signal for connecting to the first interface. The signal preferably includes the information that the defense signal is to be output. Alternatively, the signal includes the information that the defense signal is to be terminated. The control unit is individually programmable, such that various parameters, such as the volume of the defense signal, the time delay or even the melody of the defense signal, can be set.

Furthermore, it is advantageous if the control program is designed in such a manner that the signal unit provided for this purpose can no longer be deactivated by the mobile operating unit after the activation of its siren. Alternatively, it is advantageous if the control program is designed in such a manner that the signal unit provided for this purpose can be deactivated after activation with a deactivation code to be entered via the input unit. After the signal for activating the signal unit has been output by the operating unit, in particular the second interface, the operating unit is preferably automatically locked by the control program. Through the locking, it is preferable that is it is not possible to turn off the defense signal without a deactivation code. The deactivation code may be a combination of numbers, a password or even a fingerprint, which is detected by means of a sensor provided for this purpose. In any event, this should prevent the defense signal from being easily turned off without much effort.

The control program is advantageously designed in such a manner that it automatically sends an emergency call via a telecommunications unit (which is particularly wireless) of the operating unit upon the activation of the signal unit. If the activation command has been made on the operating unit, an emergency call is preferably sent concurrently with the connection of the two interfaces. Alternatively, it is conceivable that, via the telecommunications unit (which is particularly wireless), a message is automatically sent. The control unit preferably stores what persons or emergency call points should be contacted in the event of the activation of the signal unit. It is also possible that the operating unit itself does not feature a telecommunications unit, but is only connectable with one. The operating unit preferably transmits a signal, by which the separate telecommunications unit is instructed to make an emergency call. If the attacker is not deterred by the alarm signal and the victim continues to be in danger, help can be called in a timely manner.

A mobile defense system for fending off physical attacks and/or thefts with a mobile signal unit for being carried in or on a close-fitting object and a mobile operating unit for activating the mobile signal unit is also proposed. The mobile signal unit comprises a siren, by means of which an acoustic defense signal above a human pain sensation threshold can be generated. The mobile signal unit and/or the mobile operating unit are designed in accordance with one or more of the preceding and/or following characteristics of the description.

Preferably, as soon as one leaves home, the mobile signal unit is put in one's jacket pocket or handbag. In doing so, the mobile signal unit can be automatically ready to receive or be manually turned on. In the event of a physical attack, the victim only has to briefly actuate the operating unit, by means of the control unit of which a connection is established between the two interfaces of the operating unit and the signal unit. The control unit of the signal unit, after receiving a signal via the second interface, causes the siren to output an alarm signal. The alarm signal is preferably so loud that the attacker is driven away or at least refrains from further attacks on the victim due to the attention thus attracted.

It is advantageous if the mobile signal unit and the mobile operating unit are arranged in a manner physically separate. This makes it possible that, for example, in a stolen handbag, the alarm signal is output by the signal unit located therein. Since, preferably, the thief cannot turn off the alarm signal without a deactivation code, he will throw the bag aside to avoid attracting attention. Where necessary, the victim can search for the bag in a small radius.

It is advantageous to design the two interfaces in such a manner that they communicate with each other in time intervals. Therein, for example, one interface could send signals in certain time intervals, which signals are received by the other interface. If no signals can be received, for example, because the two interfaces are too far apart from each other, it is preferable that the alarm signal is automatically triggered. In doing so, it may be appropriate to inform the carrier at intervals regarding the status of both interfaces, such that the alarm is not triggered due to batteries that are too low or the like. If the two interfaces, and thus the signal and the operating unit, for example, are apart from each other over a fixed distance, the alarm signal can be triggered automatically. Therein, it is preferably not necessary to additionally bring about a command regarding the operating element or the actuating element.

Further, it is advantageous if the signal unit is sewn into an item of clothing or a carrying case. This prevents the thief or attacker from simply removing the signal unit from the carrying case and throwing it away.

BRIEF DESCRIPTION OF THE DRAWINGS

Further advantages of the invention are described in the following embodiments. The following is shown:

FIG. 1 schematic view of a mobile defense system.

DETAILED DESCRIPTION OF EXEMPLARY EMBODIMENTS

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows the mode of operation of a mobile defense system 1 in a schematic representation. The mobile defense system 1 is provided to fend off physical attacks and/or theft. It is formed by a mobile signal unit 2 and a mobile operating unit 3. To illustrate the interaction of the mobile signal unit 2 and the mobile operating unit 3, they are shown together in the mobile defense system 1. In practice, it is provided that the signal unit 2 and the operating unit 3 are physically separated from each other. The mobile signal unit 2 is designed in such a manner that, when it is intended to be used, it can be placed in a close-fitting object, such as an item of clothing, or a carrying case. Alternatively, it is conceivable to integrate (in particular, to sew) the mobile signal unit 2 firmly into an object provided for this purpose, so that the signal unit 2 is permanently carried along. The mobile operating unit 3 is, for example, an accessory, which is preferably used frequently in everyday life, a bracelet, a necklace, a ring, a cordless telecommunications unit and/or a wristwatch.

The mobile signal unit 2 features a siren 4. The siren 4 is designed to generate an acoustic defense signal above a human pain sensation threshold. The pain sensation threshold is approximately in the range above 100 db and/or 20 Pa. The signal unit 2 comprises a wireless first interface 5, via which the siren 4 can be remotely activated and/or deactivated. The activation of the siren 4 can preferably also take place via an actuating element 6 of the mobile signal unit 2. The actuating element 6 is designed in such a manner that the siren 4 can be activated manually.

The mobile signal unit 2 can be actuated via the mobile operating unit 3. For this purpose, the first interface 5 is wirelessly connectable to a second interface 7 of the mobile operating unit 3. The two interfaces 5, 7 are preferably radio or infrared interfaces that correspond to each other. The first interface 5 is designed to receive and process a signal 8 of the second interface 7. By means of the signal 8, the two interfaces 5, 7, and thus the operating unit 3 and the signal unit 2, are wirelessly connected to each other.

The signal unit 2 is designed in such a manner that the siren 4 can be activated manually with an activation command if the activation command matches an activation code stored in a memory unit 20 of the signal unit 2. In one embodiment not shown here, the memory unit 20 may also be arranged in the operating unit 3. In addition or alternatively, the signal unit 2 is designed in such a manner that the siren 4 can automatically be activated after the wireless connection to the operating unit 3, if a connection signal strength of the operating unit 3 falls below a threshold and/or the wireless connection to the operating unit 3 is interrupted.

The first and second interface 5, 7 is designed to be unidirectional, such that signals 8 can only be received through it, or is designed to be bidirectional, such that signals 8 can be both received and transmitted.

The signal unit 2 preferably features a locking system 9, by means of which, after its activation, the siren 4 can no longer be deactivated, or can only be deactivated with a deactivation command 11, which can be entered directly into the signal unit 2 or is indirectly transmitted by the operating unit 3 provided for this purpose, if such deactivation command matches a deactivation code stored in the memory unit 20 of the signal unit 2 and/or the operating unit 3 provided for this purpose.

The signal unit 2 comprises a first control unit 10, with which the activation command can be compared with the activation code stored in the memory unit 20. Furthermore, the first control unit 10 is designed in such a manner that the deactivation command is comparable with the stored deactivation code, the wireless connection to the operating unit 3 can be monitored and/or the siren 4 for activating and/or deactivating can be controlled.

The mobile operating unit 3 comprises an input unit 15 for entering the activation command and the wireless second interface 7 for connecting to the first interface 5 of the mobile signal unit 2, such that, by means of the operating unit 3, the siren 4 of the signal unit 2 can be remotely activated and/or deactivated. In one embodiment (not shown), the operating unit 3 may feature the memory unit 20, in which the activation code is stored. Furthermore, the mobile operating unit 3 features a second control unit 16 that compares the activation command entered by the user with the activation code stored in the memory unit 20 and activates the siren 4 in the event of a match.

The operating unit 3 may comprise multiple devices. For example, the operating unit 3 may comprise a first device, in particular an accessory, a bracelet, a necklace, a ring, a cordless telecommunications unit and/or a wristwatch, and a second device, in particular a telecommunications unit (which is preferably cordless), which are preferably wirelessly connectable and/or connected to each other. At this, the first device preferably comprises the input unit 15. Therein, the second device preferably comprises the wireless second interface 7, the second control unit 16 and/or the memory unit 20, if this is not arranged in the signal unit 2 but in the operating unit 3.

A deactivation code is stored in the memory unit 20, which may be arranged in the signal unit 2 and/or in the operating unit 3. Furthermore, the second control unit 16 is designed in such a manner that, after the activation of its siren 4, the signal unit 2 can be deactivated by the mobile operating unit 3 with a deactivation command to be entered via the input unit 15. For this purpose, the second control unit 16 compares the entered deactivation command with the stored deactivation code, and deactivates the siren 4 in the event of a match.

Preferably, the input unit 15 comprises a gesture recognition unit and/or speech recognition unit (not shown here) for entering the activation and/or deactivation command. For this purpose, the input unit 15 preferably features a sensor for gesture, speech and/or stress degree recognition, in particular a camera, a position sensor, a speed sensor, an acceleration sensor, a body temperature sensor, a pulse rate sensor and/or a perspiration sensor.

The second control unit 16 is designed in such a manner that it automatically sends an emergency call via a telecommunications unit 18 (which is particularly wireless) of the operating unit 3, in particular of the second device (not shown here), upon the activation of the signal unit 2.

Regardless of whether the signal unit 2 has been activated by the operating unit 3 or via the actuating element 6, the signal unit 2 is preferably designed to be locked from further commands, in particular a deactivation of the defense signal. After the signal unit 2 has been activated, the first control unit 10 causes the signal unit 2 to be locked by the locking system 9, such that the defense signal of the siren 4 cannot be switched off. By locking the signal unit 2, the siren 4 can only be deactivated if a defined deactivation code 11 is detected via the actuating element 6 or the operating unit 3. The deactivation code 11 may be, for example, a repeated pressing of the actuating element 6. Likewise, the deactivation code 6 can be entered on the operating unit 3 in the form of a number or letter sequence. If the first control unit 10 detects that the correct deactivation code 11 has been entered, it is possible to turn off the siren 4.

So that the signal unit 2 can be activated at any time, it features a power storage unit 12. By means of the power storage unit 12, the signal unit 2 can be turned on and off when needed, in particular if one is at home and out of danger. The signal unit 2 is arranged in a protective housing 13. The protective housing 13 is designed in such a manner that the siren 4 cannot be switched off without the deactivation code 11, even in the event of external force. The signal unit 2 features fastening means 14, so that it can be easily fastened to locations provided for this purpose.

Preferably, the siren 4 is a gas-operated and/or electrically operated siren 4, whereas the actuating element 6 is a push button. If the actuating element is operated, in particular pressed, the alarm signal is generated by the gas. Alternatively, the siren 4 is activated by an activation command, in particular the signal 8, being sent via the operating unit 3. If the siren 4 is operated with gas, no additional power storage unit 12 is necessary. Through a corresponding electromechanical design of the signal unit 2, the siren 4 is then triggered.

The operating unit 3 features an input unit 15. The input unit 15 is, for example, the display and/or the keyboard of a telecommunications unit (which is preferably cordless), for example a mobile telephone, a button or a sensor. The input unit 15 features a second control unit 16. A control program 17 is stored in the second control unit 16. If the command for activating the defense signal is detected by the input unit 15, the second control unit 16 causes the second interface 7 to send to the first interface 5 the signal 8 for activating the siren 4. Concurrently or immediately thereafter, the operating unit 3 is locked by the control program 17. The locking of the operating unit 3 prevents the defense signal from being deactivated without a hurdle. It is conceivable that the control program 17 causes the activation of the locking system 9 of the signal unit 2, such that the deactivation of the defense signal is prevented at the signal unit 2 itself. As a result, the victim, for example in the case of a stolen handbag, could even send an emergency call with the operating unit 3.

In order to deactivate the siren 4, the deactivation code 11 must be entered into the input unit 15. Preferably, the deactivation code 11 is adjusted with the data stored in the locking system 9 of the signal unit 2. Alternatively, the deactivation code 11 is entered directly to the signal unit 2. If the correct deactivation code 11 is detected in the second control unit 16, the second interface 7 sends a new signal 8 to the first interface 5 in order to terminate the generation of the alarm signal.

In addition, it may be sensible if the operating unit 3 comprises a telecommunications unit 18 (which is particularly wireless). Telephone numbers can be stored in the control program 17; such numbers are contacted automatically in the event of the activation of the defense signal. Alternatively, the operating unit 3 may be wirelessly connected to a telecommunications unit 18 (which is particularly wireless). In the case of an emergency, the operating unit 3 transmits, for example via the second interface 7, an emergency signal, which is received by the telecommunications unit 18. The telecommunications unit 18 then automatically sends an emergency call.

The signal unit 2 may feature a lighting element 19. The lighting element 19 is designed to generate an optical signal at the same time as the acoustic defense signal of the siren 4. The optical signal is preferably a flashlight. The lighting element 19 may also be formed as a lamp, a rotating mirror light, an LED light or a flashing light.

In a preferred embodiment, it is thus conceivable that the mobile operating unit 3 is a first operating device, in particular an accessory, a bracelet, a necklace, a ring, a cordless telecommunications unit and/or a wristwatch. Previously, an activation code and/or a deactivation code had been set by the user and stored in the memory unit 20. This can take place, for example, by training a gesture, in particular a hand movement. Such a gesture, in particular hand movement, can be detected by the sensor system of the operating unit. The second control unit 16 may be integrated in the first operating device. Alternatively, it is also conceivable that the first operating device is connected to a further device, for example a telecommunications unit (which is preferably cordless). Thus, the telecommunications unit (which is preferably cordless) would be a component of the mobile operating unit 3. The second control unit 16 would thus be integrated in the telecommunications unit (which is preferably cordless). For example, upon a physical attack, the user would thus make a defensive gesture that represents the gesture-controlled activation command. The hand movement would be detected by the sensor system of the first operating device, in particular the accessory, the bracelet, the necklace, the ring and/or the wristwatch, and would be compared by the second control unit 16 with the activation code stored in the memory unit 20. Thus, in the event of a match, the siren 4 of the mobile signal unit 2 would be activated immediately. Alternatively, such adjustment of activation command and activation code could be performed by the first control unit 10 of the mobile signal unit 2. A deactivation could take place in an analogous manner.

This invention is not limited to the illustrated and described embodiments. Variations within the scope of the claims, just as the combination of characteristics, are possible, even if they are illustrated and described in different embodiments.

LIST OF REFERENCE SIGNS

1 Mobile defense system
2 Mobile signal unit
3 Mobile operating unit
4 Siren
5 First interface
6 Actuating element
7 Second interface
8 Signal
9 Locking system
10 First control unit
11 Deactivation code
12 Power storage unit
13 Protective housing
14 Fastening means
15 Input unit
16 Second control unit
17 Control program
18 Telecommunications unit
19 Lighting element
20 Memory unit

The invention claimed is:

1. Mobile operating unit for activating and/or deactivating a mobile signal unit that includes a first memory unit, a siren for generating an acoustic defense signal, an activation element connected to the siren and configured for selective manual activation of the siren and further configured so that the siren can be activated by an activation command that matches an activation code, and a wireless first interface connected to the activation element and to the first memory unit, the mobile operating unit comprising:
an input unit for entering an activation command;
a wireless second interface connected to the input unit and configured for connecting to the wireless first interface of the mobile signal unit;
a second memory unit connected to the wireless second interface and wherein an activation code is stored in the first memory unit or in the second memory, unit; and
a second control unit connected to the second memory unit and configured for comparing with the stored activation code an activation command entered via the input unit and accordingly activating the siren in the event of a match between the entered activation command and the activation code stored in the first or second memory unit.

2. Mobile operating unit according to claim 1, wherein the input unit connected wirelessly to the wireless second interface, the second control unit and the memory unit.

3. Mobile operating unit according to claim 1, wherein the second control unit is further configured such that, after the activation of the siren, the siren can no longer be deactivated by the mobile operating unit.

4. Mobile operating unit according to claim 1, wherein a deactivation code is stored in the memory unit, wherein the second control unit is further configured such that, after the activation of the siren, the siren can only be deactivated with a deactivation command to be entered via the input unit, wherein the second control unit compares the entered deactivation command with the deactivation code stored in the memory unit and deactivates the siren in the event of a match.

5. Mobile operating unit according to claim 1, wherein the input unit is configured for entering an activation command and/or a deactivation command and includes a gesture recognition unit and/or a speech recognition unit.

6. Mobile operating unit according to claim 5, wherein the input unit includes at least one of the following sensors: a sensor for gesture recognition, speech recognition sensor, a stress degree recognition sensor, a camera, a position sensor, a speed sensor, an acceleration sensor, a body temperature sensor, a pulse rate sensor and a perspiration sensor.

7. Mobile operating unit according to claim 1, further comprising a cordless telecommunications unit, and wherein the second control unit is configured so that, upon the activation of the siren, the second control unit automatically sends an emergency call via the cordless telecommunications unit.

8. Mobile defense system for fending off physical attacks and/or thefts, the mobile defense system comprising:
a siren for generating an acoustic defense signal;
an activation element connected to the siren and configured for selective manual activation of the siren;
a wireless first interface connected to the activation element;
an input unit for entering an activation command,
a wireless second interface connected to the input unit and configured for connecting to the wireless first interface,
a memory unit in which an activation code is stored, the memory unit being connected to the wireless first interface or to the wireless second interface; and
a control unit connected to the memory unit and configured for comparing with the stored activation code an activation command and accordingly activating the siren in the event of a match between the entered activation command and the activation code stored in the memory unit.

9. Mobile operating unit for activating and/or deactivating a mobile signal unit that includes a first memory unit, a first control unit, a siren for generating an acoustic defense signal, an activation element connected to the siren and configured for selective manual activation of the siren and further configured so that the siren can be activated by an activation command that matches an activation code, and a wireless first interface connected to the activation element and to the first memory unit, the mobile operating unit comprising:
an input unit for entering an activation command;
a wireless second interface connected to the input unit and configured for connecting to the wireless first interface of the mobile signal unit;
a second memory unit connected to the wireless second interface;
wherein an activation code is stored in the first memory unit or in the second memory unit; and
wherein the second memory unit is connected to the first control unit, which is configured for comparing the stored activation code with an activation command entered via the input unit and accordingly activating the siren in the event of a match between the entered activation command and the activation code stored in the first or second memory unit.

* * * * *